(12) United States Patent
Twiestmeyer et al.

(10) Patent No.: US 7,997,849 B2
(45) Date of Patent: Aug. 16, 2011

(54) GRAIN BAG UNLOADER

(76) Inventors: Terry B. Twiestmeyer, Grand Island, NE (US); Steven C. Hood, Springfield, MO (US); William C. Schafer, Hector, MN (US)

(*) Notice: Subject to any disclaimer, the term of this patent is extended or adjusted under 35 U.S.C. 154(b) by 737 days.

(21) Appl. No.: 12/148,581

(22) Filed: Apr. 21, 2008

(65) Prior Publication Data

US 2009/0263223 A1     Oct. 22, 2009

(51) Int. Cl.
*B65B 21/02* (2006.01)
(52) U.S. Cl. ................................ 414/412; 241/101.742
(58) Field of Classification Search .................. 414/403, 414/411, 412; 241/101.72, 101.742
See application file for complete search history.

(56) References Cited

U.S. PATENT DOCUMENTS

| | | | |
|---|---|---|---|
| 4,420,119 A | 12/1983 | Johnson | |
| 6,109,552 A | 8/2000 | Strankman | |
| 7,234,909 B2* | 6/2007 | Jonkka | 414/302 |
| 7,802,956 B2* | 9/2010 | Schertz et al. | 414/403 |
| 7,861,851 B2* | 1/2011 | Dekoning | 198/513 |

OTHER PUBLICATIONS

Richiger Whole grain silo bag unloader model EA-180 brochure, advertised by Show-Me Shortline co. LLC, PO Box 6, Centralia, MO 65240, 866-682-5514, www.showmeshortline.com.
Mainero, Grain Handler Mainero 2330 brochure, Rivadavia N 259 X2550DZE Bell Ville-Republic of Argentina Tel/Fax +54 3534 426431 to 34, www.mainero.com.ar.
Grain Bag® Storage System brochure, Twiestmeyer & Assoc, Inc., 3119 Briarwood Blvd, Grand Island, NE 68801, Tel. 308-390-2660, www.grainbagsystem.com.

* cited by examiner

*Primary Examiner* — Charles A Fox
(74) *Attorney, Agent, or Firm* — Dennis L. Thomte; Thomte Patent Law Office LLC

(57) ABSTRACT

A grain bag unloader is described for unloading grain from a grain bag wherein the unloader is moved rearwardly and operated by a tractor. The grain bag unloader includes a wheeled frame having a grain hopper at the rearward end thereof with a transversely extending unloading auger which is adapted to be inserted into the lower end of a field grain bag and which conveys grain from the grain bag into the grain hopper. The grain bag unloader also includes a discharge auger which extends upwardly and laterally from the grain hopper. The grain bag unloader also includes a grain bag winder tube. The grain unloader includes a first clutch which is able to disengage the operation of the unloading auger while permitting the discharge auger to continue to operate. The grain bag unloader also includes a second clutch which is designed to disengage the bag winder tube.

3 Claims, 11 Drawing Sheets

GRAIN BAG UNLOADER

BACKGROUND OF THE INVENTION

1. Field of the Invention

This invention relates to a grain bag unloader or extractor for unloading or extracting grain from a grain bag or silo bag positioned on the ground and which is filled with grain. More particularly, this invention relates to an improved grain bag unloader which is safer and more convenient to use than the prior art grain bag unloading machines.

2. Description of the Related Art

A grain bag or a silo bag is a long polyethylene bag which is positioned on the ground or other supporting surface and which may be filled with grain for storage purposes. The bag is filled through the use of a grain bagging machine which can be filled from a combine, grain cart or similar types of machinery. The grain bag is normally emptied or unloaded by a grain unloading machine which rolls the bag up as it augers the grain out of the bag to a truck or the like.

One type of prior art grain unloading system is that marketed by Richiger and identified as Model EA-180. In the EA-180 model, a wheeled frame is provided which is connected to the hitch of a tractor. A transversely extending grain unloading auger is provided at the rearward end of the wheeled frame with the grain unloading auger sweeping or augering grain towards the center thereof into a grain hopper. An upwardly and angularly extending grain discharge auger has its lower end in communication with the grain hopper for discharging the grain from the side of the machine into a truck, cart or trailer. A bag take-in roller or bag winder is rotatably mounted on the wheeled frame forwardly of the grain unloading auger and the discharge auger which rolls or winds the empty grain bag thereon as the grain is being unloaded from the grain bag. Although the Model EA-180 machine has met with some success, it is believed that there are two shortcomings or disadvantages of that machine. First, the unloading auger and the grain discharge auger are operated simultaneously and it is not possible to easily disengage the grain unloading auger while the discharge auger is discharging grain. During the clean-up operation, as the final remnants of the grain are being emptied from the bag, it is sometimes advantageous to be able to shovel the remaining grain into a finishing hopper which is in communication with the grain hopper but the same is dangerous since if the grain discharge auger is being operated, the grain unloading auger will also be operated which can pose a hazard for a person standing near the rotating grain unloading auger.

A further shortcoming of the Model EA-180 is in the manner in which the bag is removed from the bag winder or take-in roller after the bag has been emptied. Normally, the bag is removed from the bale winder by positioning a truck or tractor on the free end of the bag and then driving the tractor, which is connected to the grain unloading machine, forwardly thereby pulling the bag from the bag winder. However, this task is made difficult due to the fact that the bag winder is powered by a hydraulic motor through a reduction gear case both of which offer considerable resistance to the reverse rotation of the bag winder.

SUMMARY OF THE INVENTION

A grain bag unloader is provided for unloading grain from a grain bag or silo bag wherein the unloader is moved rearwardly and operated by a tractor having a hitch, a hydraulic system and a PTO. The machine of this invention comprises a wheeled frame which has forward and rearward ends and first and second sides. A tongue member extends from the forward end of the wheeled frame for connection to the hitch of the tractor. An elongated main drive shaft is rotatably mounted on the wheeled frame and has forward and rearward ends. The forward end of the main shaft is adapted to be coupled to the tractor PTO.

An elongated, transversely extending first frame member is mounted on the wheeled frame and has first and second ends positioned at the first and second sides of the wheeled frame. An elongated, horizontally disposed bag winder tube is rotatably mounted on the first frame member and has first and second ends. A first support is provided at one end of the first frame member and has a hydraulic motor mounted thereon. A chain and sprocket assembly or gear reduction assembly is mounted on the first support which connects the drive shaft of the hydraulic motor to the bag winder tube for rotating the bag winder tube in a bag winding direction as the grain bag is being unloaded. The chain and sprocket assembly includes a manually movable first clutch assembly which is movable between engaged and disengaged positions. The first clutch assembly, when in its engaged position, enables the hydraulic motor and the chain and sprocket assembly to rotate the bag winder tube in a first bag winding direction. The first clutch assembly, when in its disengaged position, causes the bag winder tube to be disconnected from the chain and sprocket assembly so that the bag winder tube may be freely rotated in a bag unwinding direction to enable a bag, which is wound upon the bag winder tube, to be pulled therefrom without the resistance of the chain and sprocket assembly and the hydraulic motor.

A grain hopper is mounted at the rearward end of the wheeled frame. A transversely extending unloading auger is positioned at the rearward end of the wheeled frame and is adapted to be inserted into the lower end of a filled grain bag. The unloading auger is comprised of first and second auger sections which have inner and outer ends. The inner ends of the first and second auger sections are in communication with the grain hopper whereby grain in the grain bag will be augered into the grain hopper by the auger's first and second auger sections.

An inclined discharge auger, having upper and lower ends, is mounted on the wheeled frame with the lower end of the discharge auger being in communication with the grain hopper. The discharge auger extends upwardly and laterally outwardly from its lower end towards its upper end.

A gear box is mounted on the wheeled frame and has an input shaft and first and second output shafts. The input shaft of the gear box is operatively connected to the main drive shaft which is connected to the tractor PTO. A first drive train assembly connects the first output shaft of the gear box to the discharge auger for powering the same. A second drive train assembly connects the second output shaft of the gear box to the unloading auger for powering the same. A second clutch assembly is imposed in the second drive train and Which is selectively movable between engaged and disengaged positions. The second clutch assembly, when its engaged position, permits rotational power to be provided to the unloading auger. The second clutch assembly, when in its disengaged position, prevents rotational power to be furnished to the unloading auger thereby deactivating the same. The second clutch assembly, by permitting the deactivation of the unloading auger while the discharge auger continues to operate, enables a person to safely shovel grain into the grain hopper or finishing hopper while standing near the inoperative unloading auger.

It is therefore a principal object of the invention to provide an improved grain bag unloading machine.

A further object of the invention is to provide an improved grain unloading machine which permits the grain bag winder tube thereof to become free-wheeling to enable a bag wound on the bag winder tube to be easily unwound therefrom.

Still another object of the invention is to provide a grain bag unloading machine including means for deactivating the grain unloading auger without deactivating the grain discharge auger thereof, thereby enabling a person to safely stand near the deactivated grain unloading auger to shovel loose grain into the grain hopper or finishing hopper for discharge by the discharge auger.

These and other objects will be apparent to those skilled in the art.

DESCRIPTION OF THE PREFERRED EMBODIMENT

Figure 1:
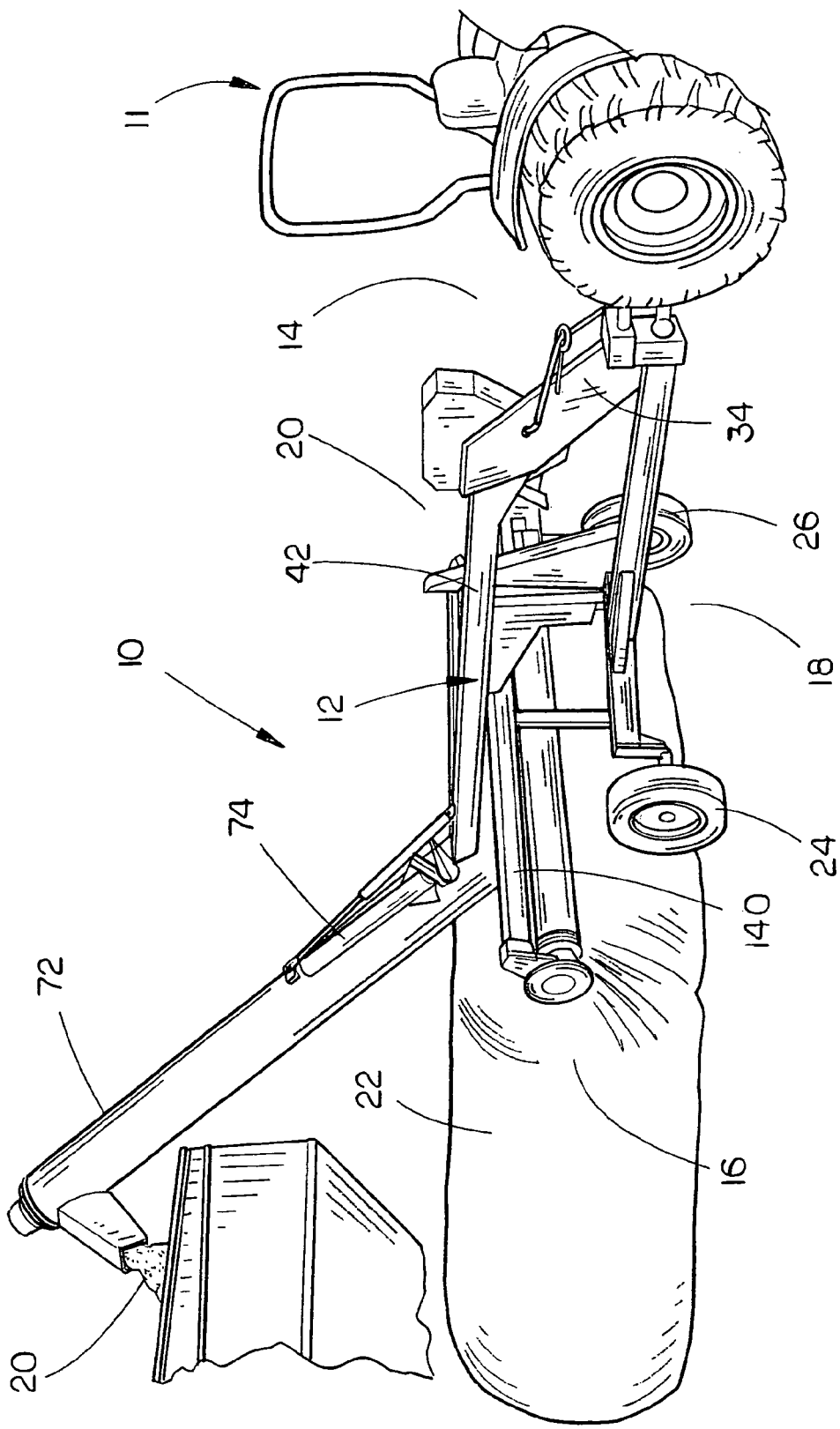
FIG. 1 is a front perspective view of the grain bag unloader of this invention which is hooked to the hitch of a tractor and which is depositing grain into a truck or grain cart.
Figure 2:
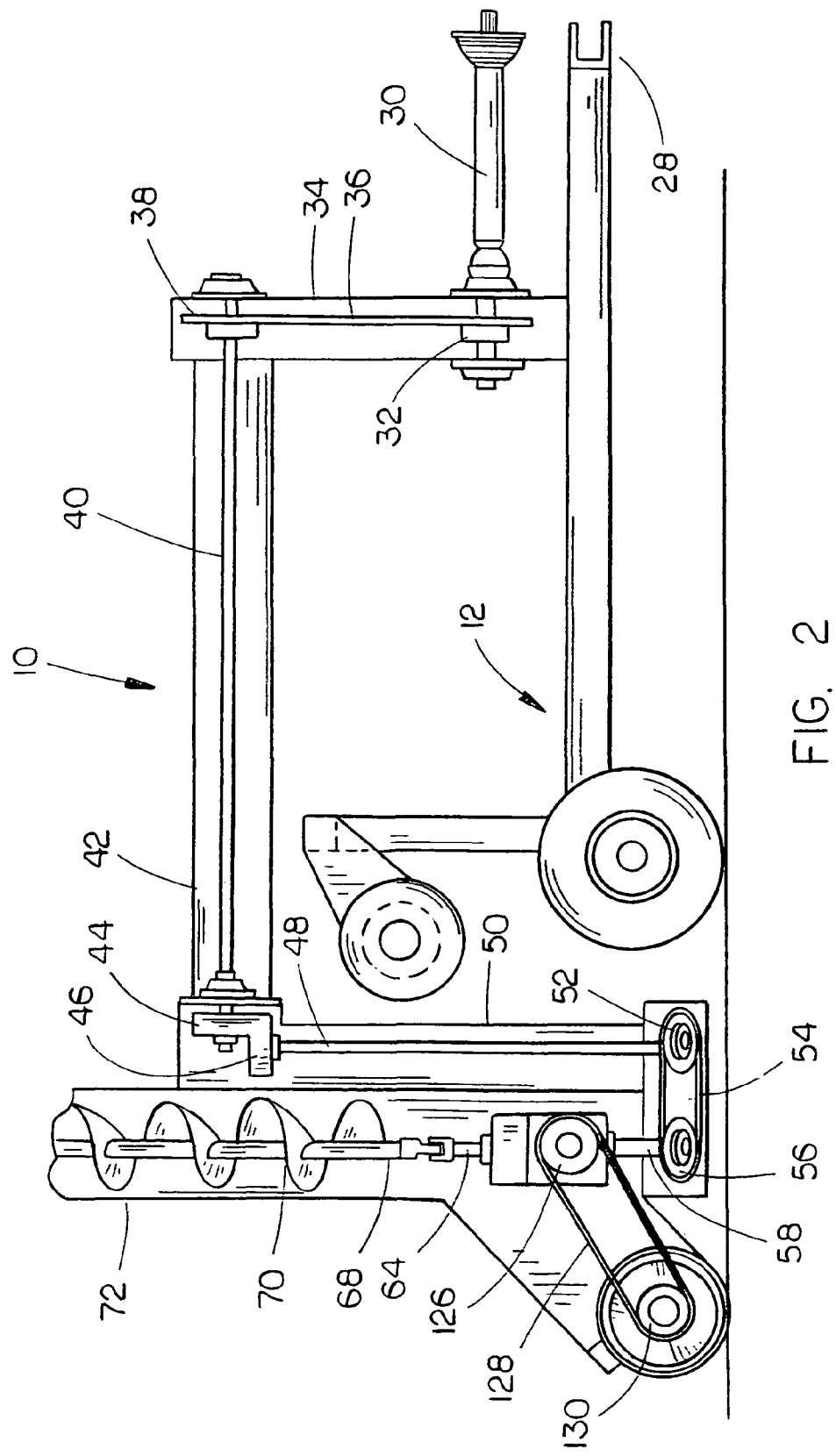
FIG. 2 is a side schematic view of a portion of the power train of the machine.
Figure 3:
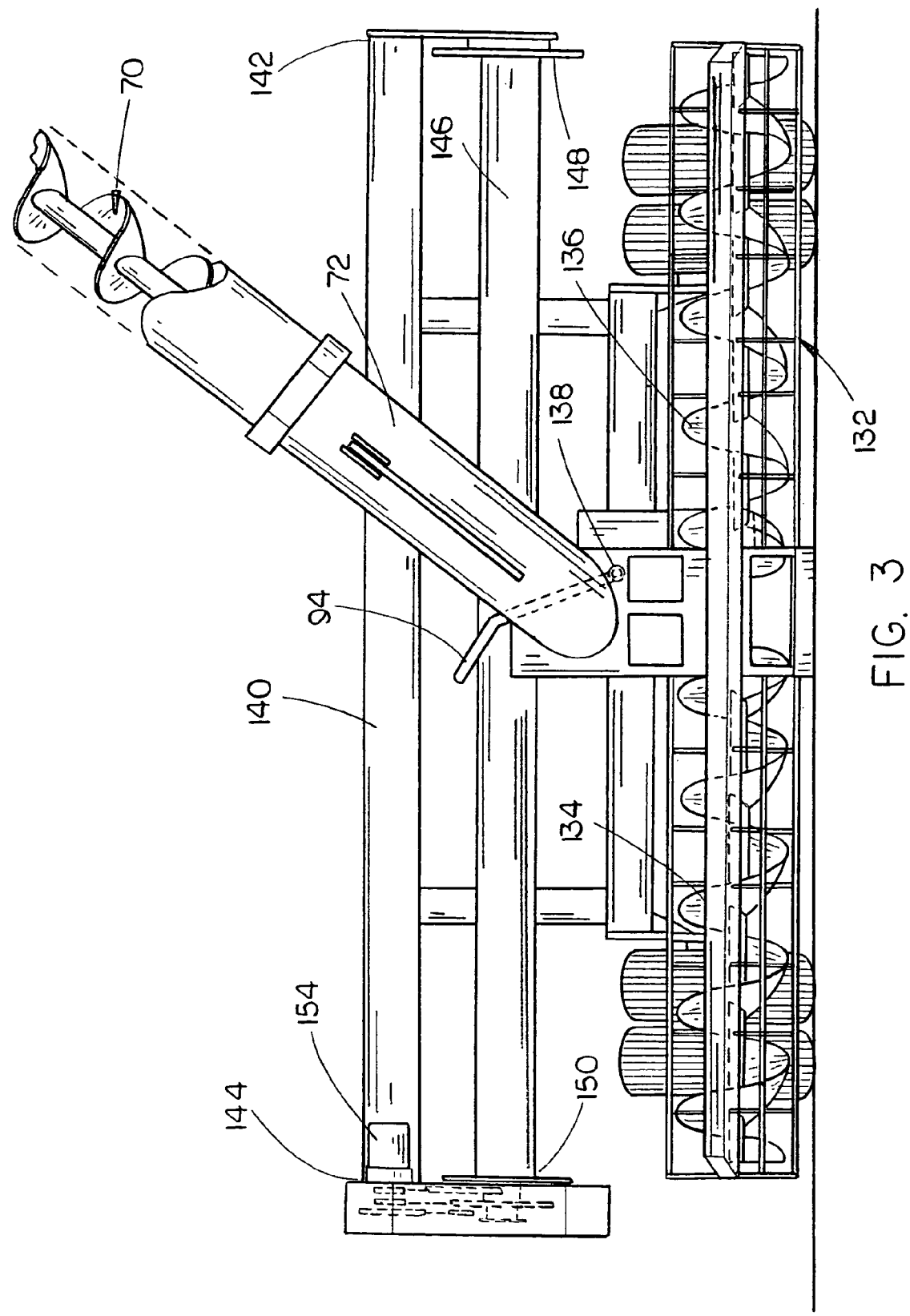
FIG. 3 is a partial rear elevational view of the machine.
Figure 4:
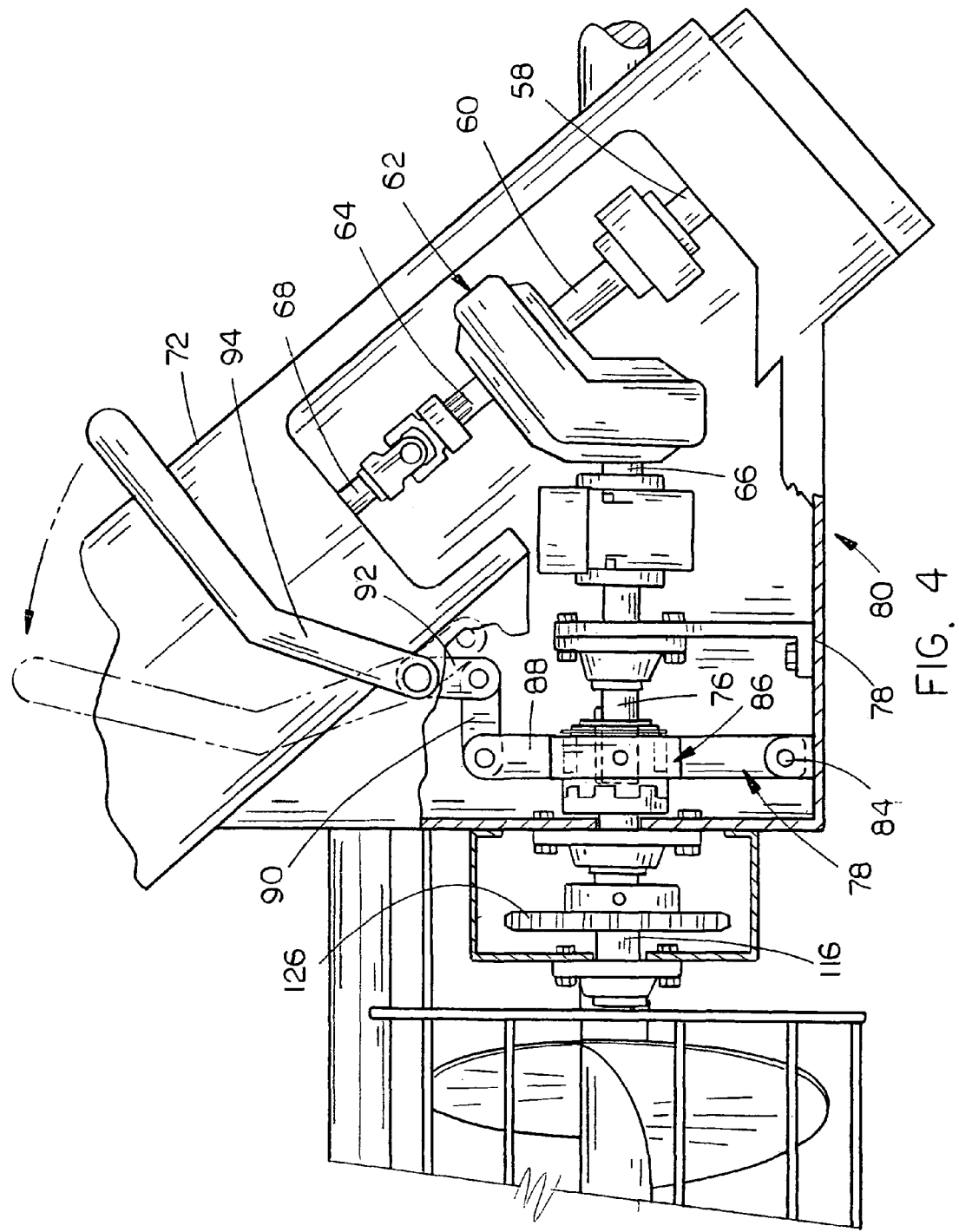
FIG. 4 is a partial rear elevational view of the clutch mechanism for the grain unloading auger with portion thereof cut away to more fully illustrate the invention.
Figure 5:
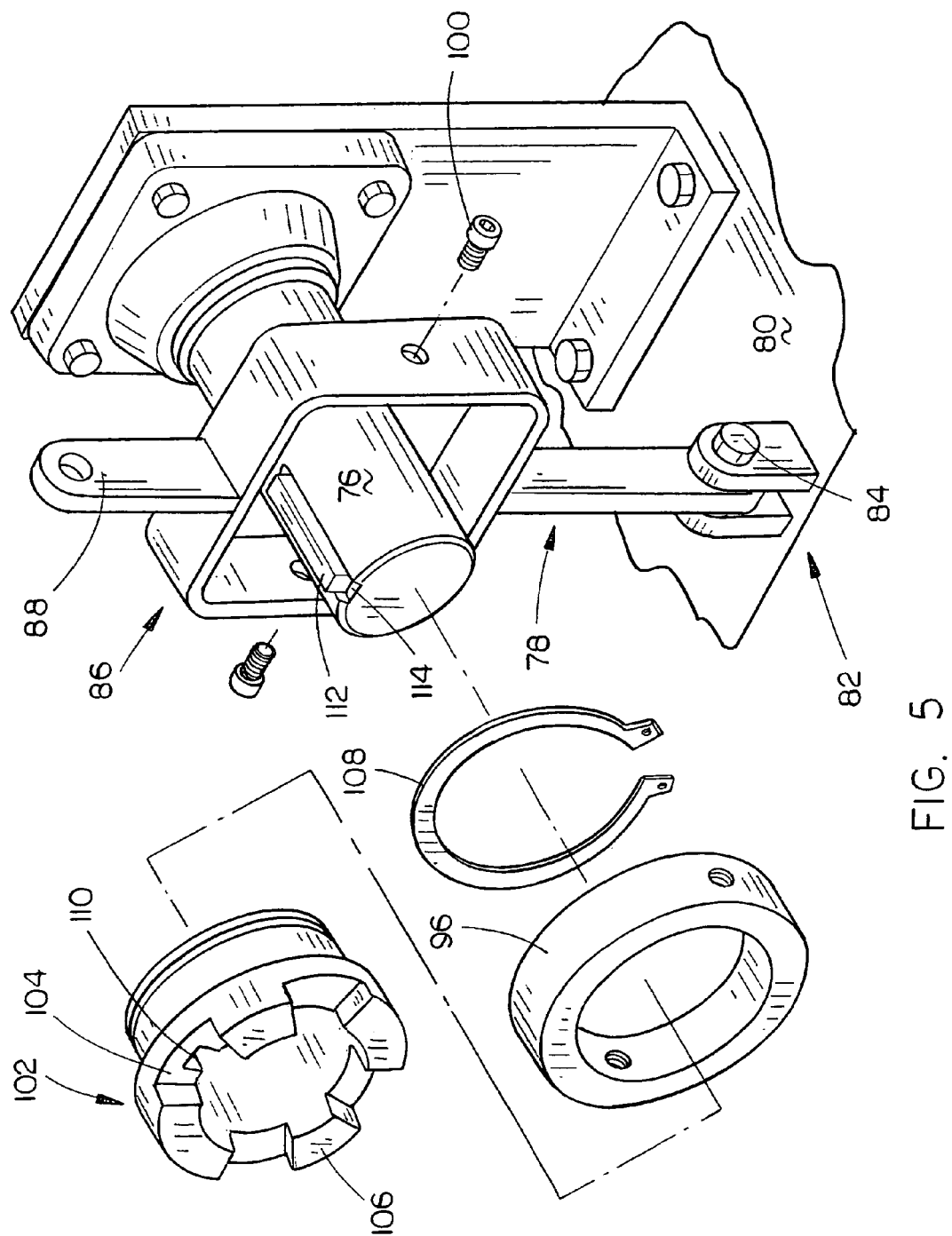
FIG. 5 is a partial perspective view of the clutch mechanism of FIG. 4.

The grain bag unloader of this invention is designated by the reference numeral 10, which is designed to be moved rearwardly by a tractor 11 having a hitch, a hydraulic system and a PTO. Grain bag unloader 10 includes a wheeled frame means 12 having a forward end 14, a rearward end 16, and opposite sides 18 and 20. The grain bag unloader 10 of this invention is designed to unload grain 20 from an elongated polyethylene grain bag or silo bag 22 which is resting on the ground or other supporting surface. Frame means 12 includes wheel assemblies 24 and 26 thereon. The wheel assemblies 24 and 26 are normally pivotally mounted on the frame means 12 to enable the rearward end of the frame means 12 to be raised and lowered between transport and operative positions.

Frame means 12 includes a forwardly extending tongue or hitch member 28 which is adapted to be secured to the rearwardly extending hitch of the tractor 11 in conventional fashion. The numeral 30 refers to a PTO shaft 30 which is adapted to be connected to the PTO of the tractor 11. The rearward end of shaft 30 is connected to a sprocket 32 which is rotationally mounted within a casing or housing 34 mounted on the frame means 12. A chain 36 extends around the sprocket 32 and extends upwardly in the casing 34 and extends around the sprocket 38 which is mounted on the forward end of a drive shaft 40 which extends rearwardly through the hollow tube or frame member 42. The rearward end of shaft 40 has a gear 44 mounted thereon which is in mesh with a gear 46 mounted on the upper end of shaft 48 which extends downwardly through casing 50. A sprocket 52 is mounted on the lower end of shaft 48 and has a chain 54 extending thereon. Chain 54 extends around a sprocket 56 which is mounted on the lower end of shaft stub 58. Shaft stub 58 extends upwardly and inwardly to input shaft 60 of an angled gear box 62 which has output shafts 64 and 66 extending therefrom. Shaft 64 is connected to the shaft 68 of a discharge auger 70 which extends upwardly and outwardly through discharge auger tube 72. Preferably, the auger tube 72 may be selectively moved between its discharge position illustrated in FIG. 1 to a folded transport position by a hydraulic cylinder 74 in conventional fashion.

Shaft 66 is operatively coupled to a keyed or splined shaft 76. The numeral 78 refers to a clutch actuator mechanism which is pivotally secured to bottom 80 of casing 82 at 84. Clutch actuator 78 includes a square-shaped support 86 having an arm 88 extending upwardly therefrom. The upper end of arm 88 is pivotally secured to a link 90 which is pivotally secured to link 92 which is secured to handle or lever 94.

Ring 96 is received within support 86 and is secured thereto by alien screws 98 and 100. Gear 102 including alternating recesses 104 and teeth 106 are secured to ring 96 by a snap-ring 108. Gear 102 includes a keyway 110 which slidably receives the key 112 mounted in slot 114 formed in shaft 76.

Figure 6:
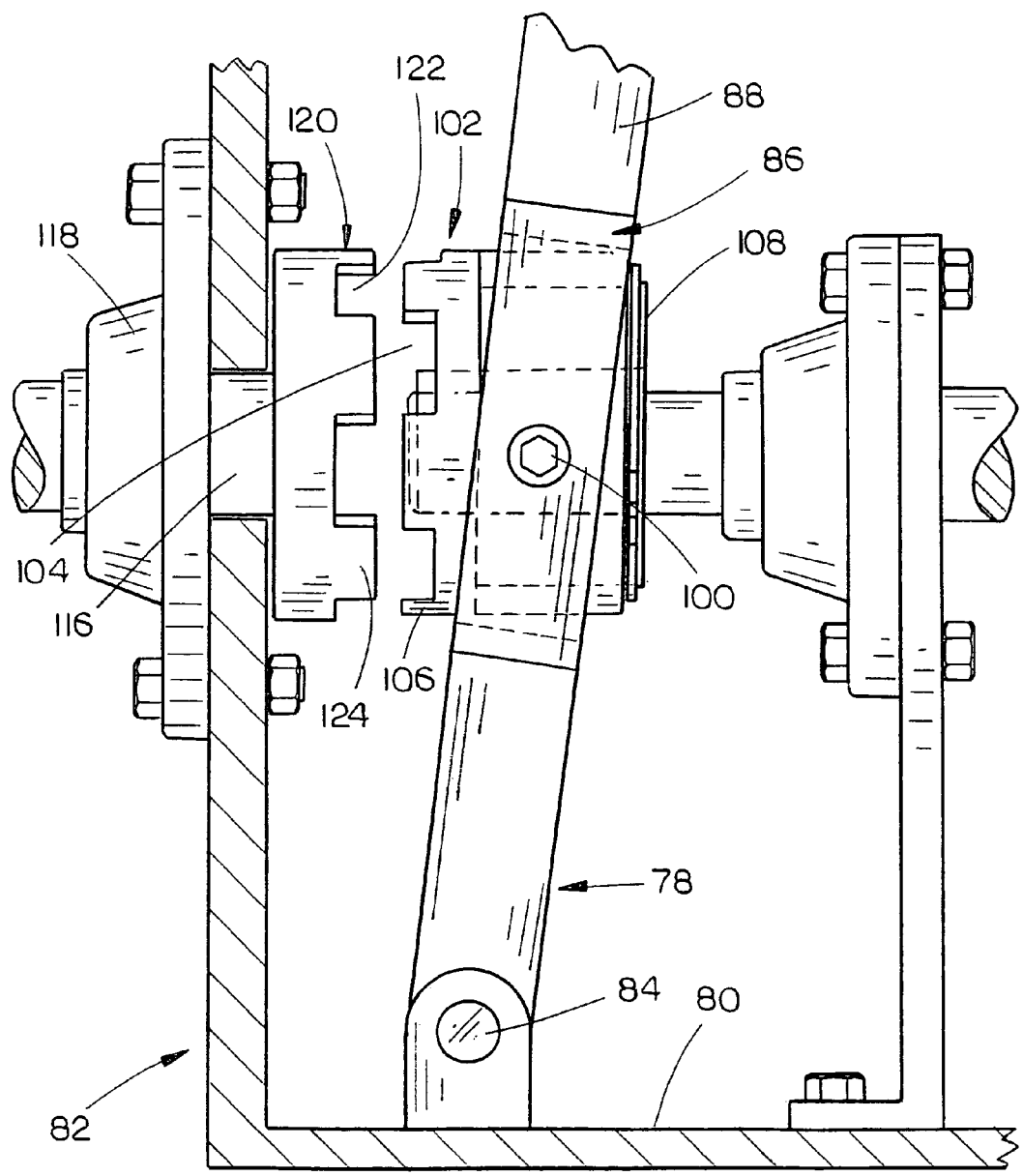
FIG. 6 is a partial side view of the clutch mechanism of FIGS. 4 and 5 with the clutch mechanism in a disengaged position.

Shaft 116 is rotatably mounted in bearing 118 which is secured to the casing 82 (FIG. 6) and has a gear 120 mounted thereon which includes alternating recesses 122 and teeth 124 adapted to mesh with teeth 106 and recesses 104 of gear 102 as will be described hereinafter.

Sprocket 126 is operatively coupled with shaft 116 and has a chain 128 extending therearound which extends around sprocket 130 which is connected to the transversely extending unloader auger assembly 132. Assembly 132 includes auger portions 134 and 136 which are adapted to auger grain towards the middle of the auger assembly 132 into a discharge hopper 138 which is in communication with the lower end of the discharge auger assembly 73 which is comprised of the auger tube 72 and auger 70.

Figure 8:
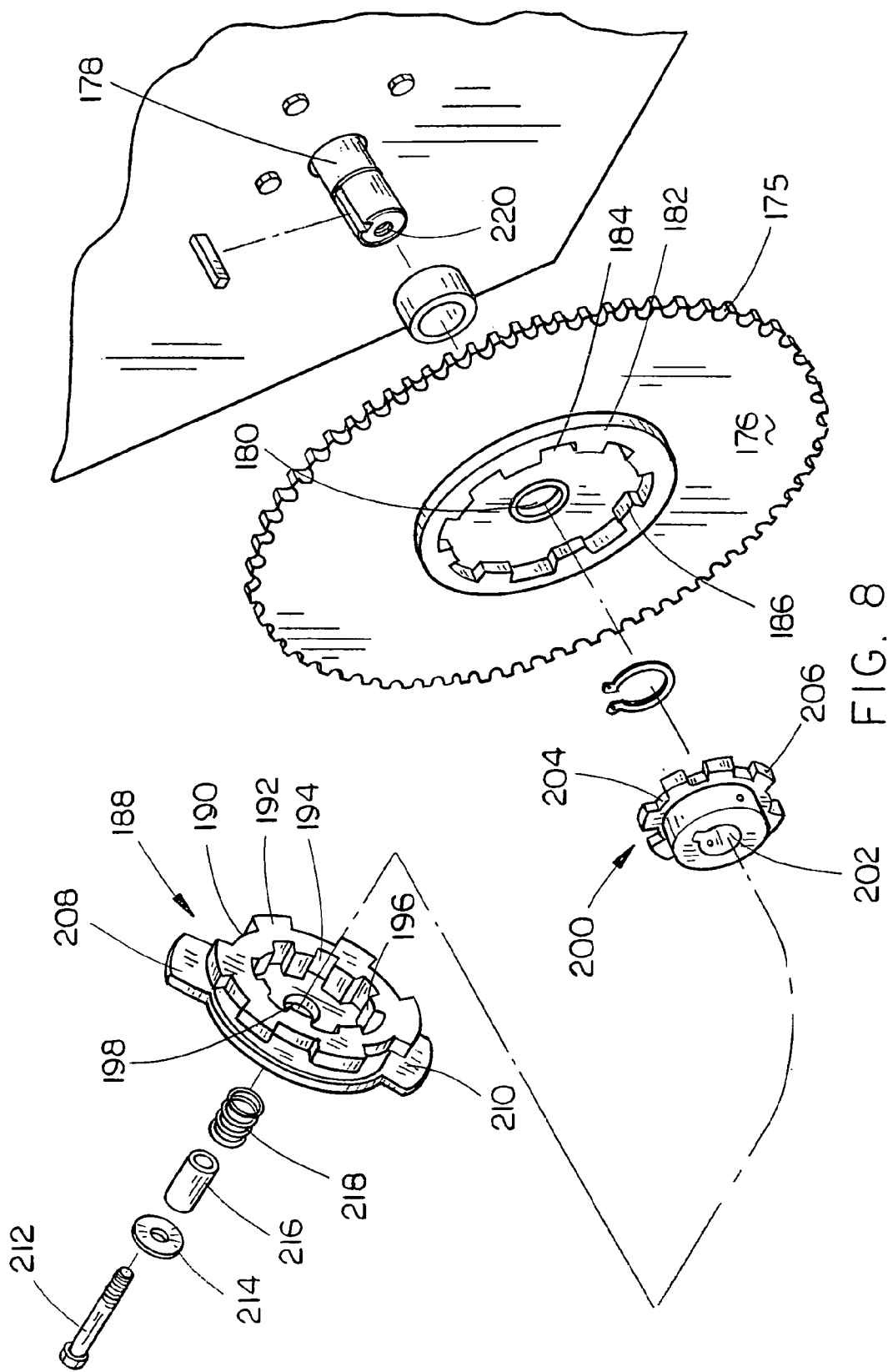
FIG. 8 is an exploded partial perspective view of the clutch mechanism of the bag unwinder tube.
Figure 9:
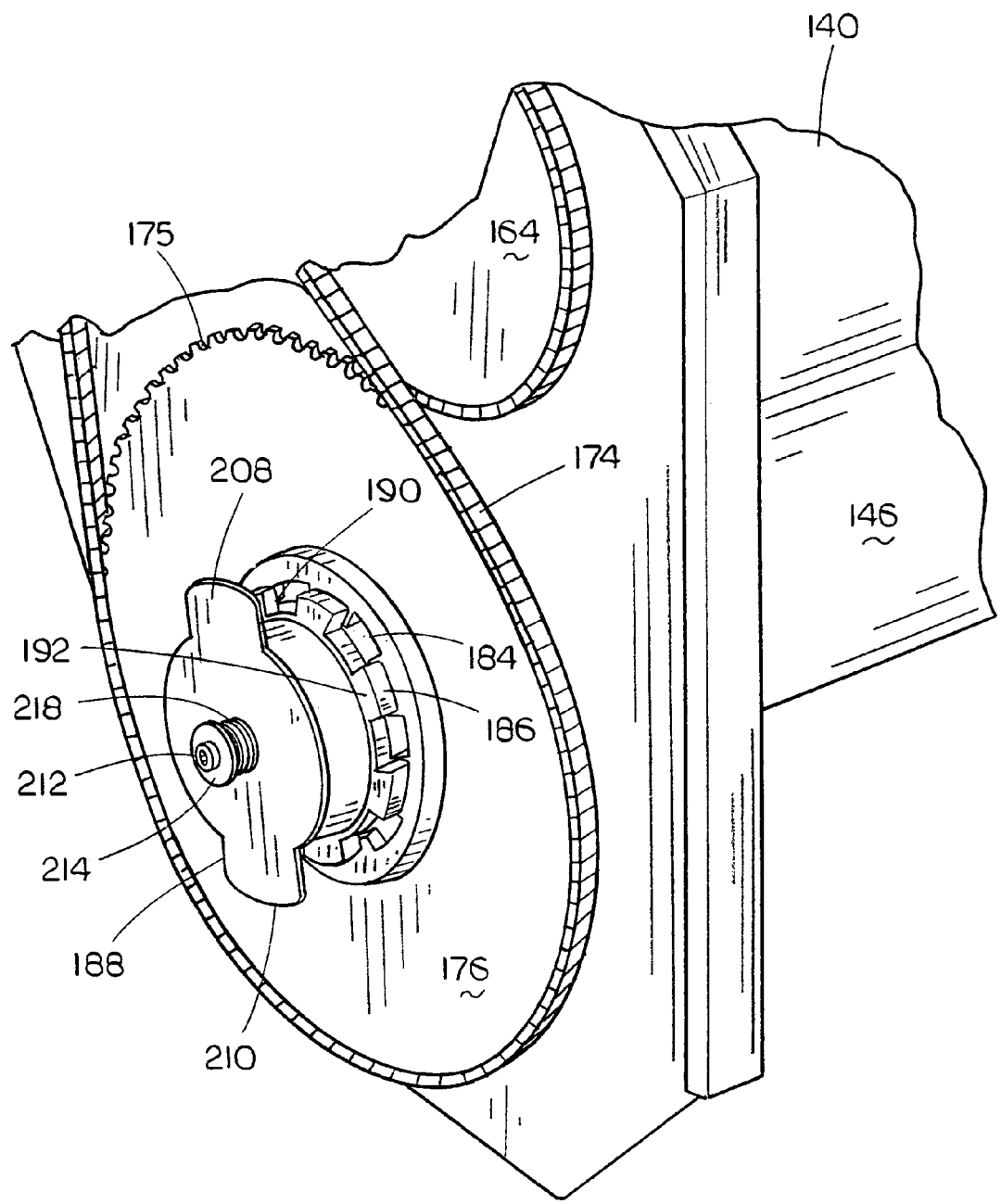
FIG. 9 is a partial perspective view of the clutch mechanism of FIG. 8 in its disengaged position.
Figure 10:
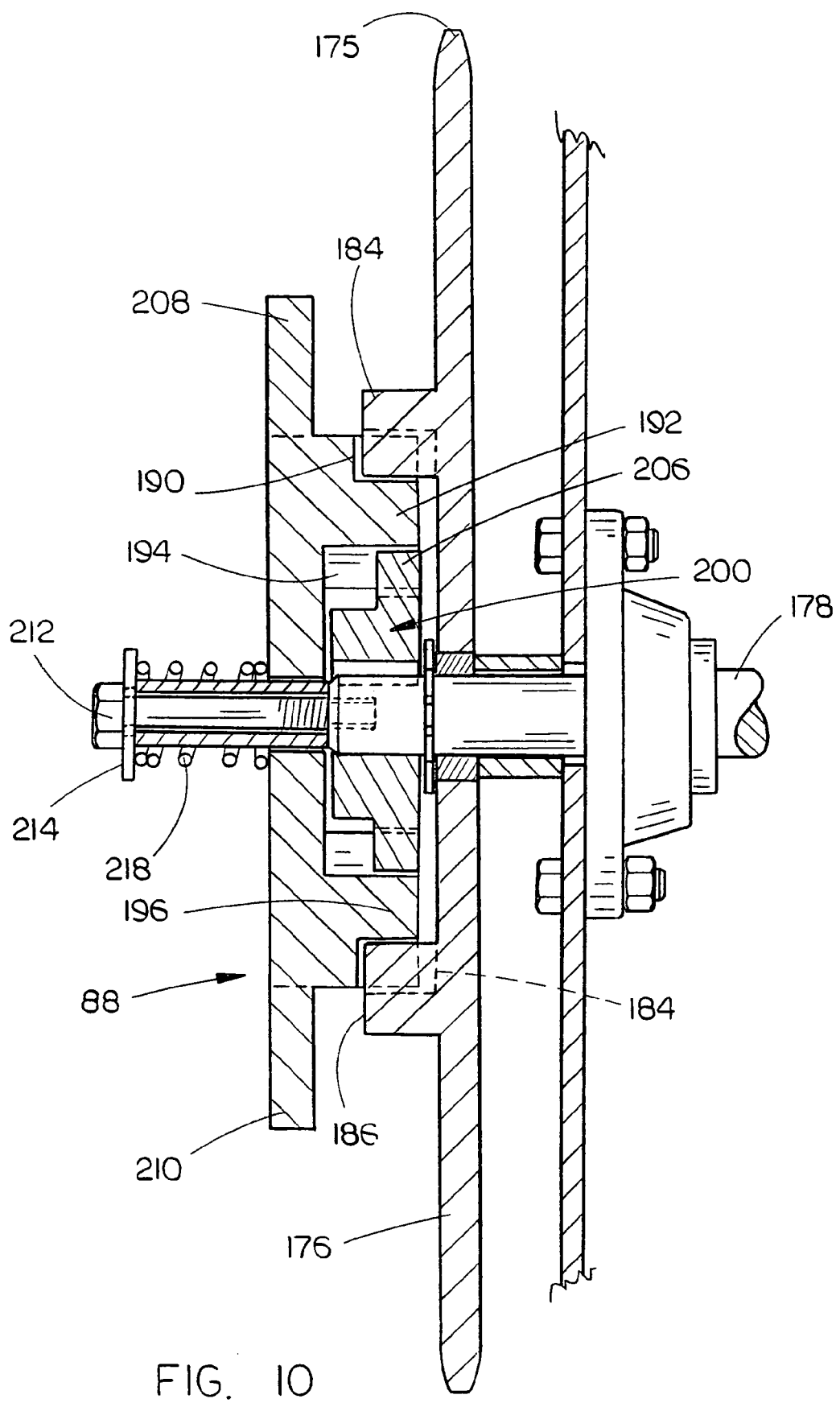
FIG. 10 is a sectional view of the clutch mechanism of FIGS. 8 and 9 in its engaged position.
Figure 11:
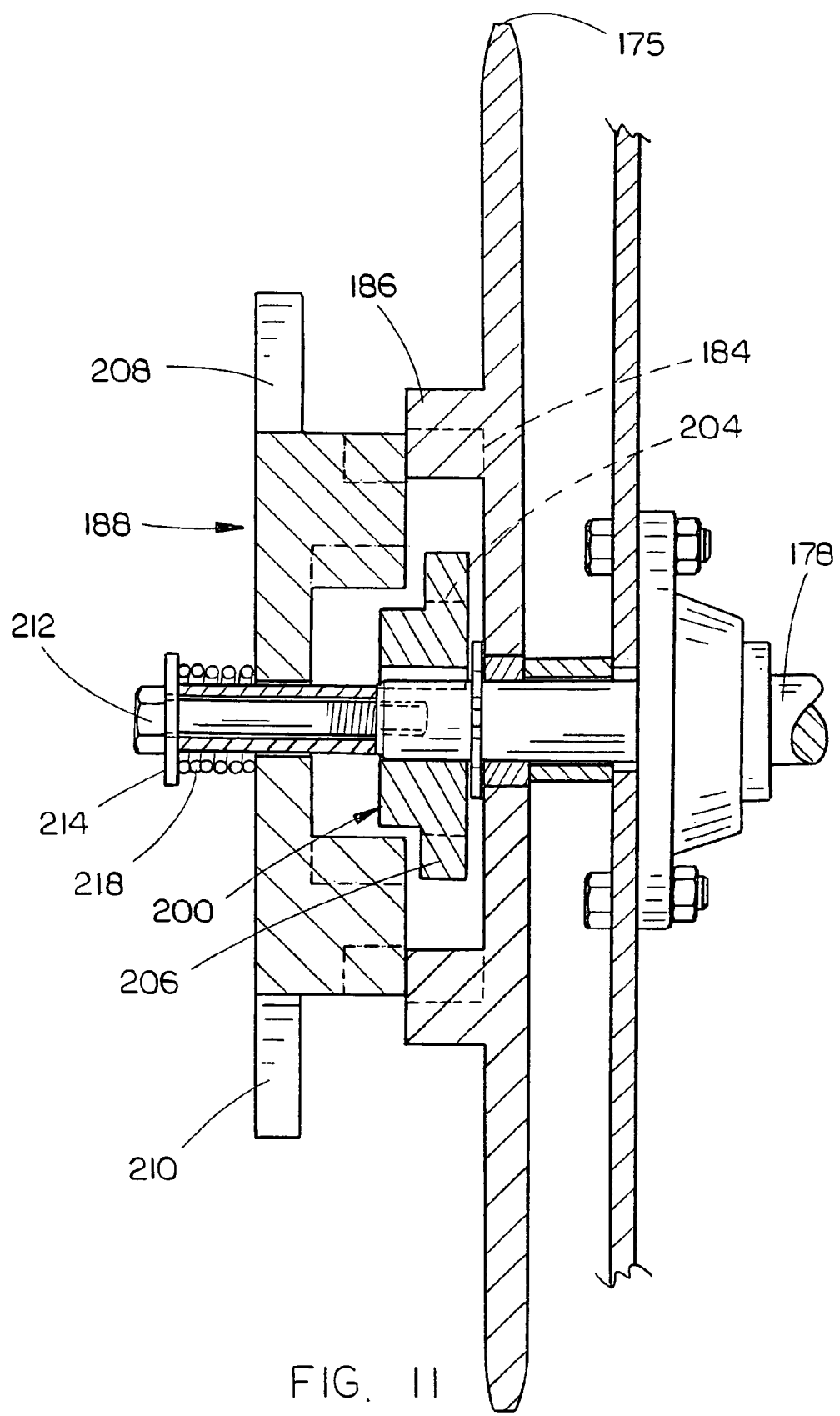
FIG. 11 is sectional view similar to FIG. 10 except that the clutch mechanism is in its disengaged position.

The numeral 140 refers to an elongated, transversely extending frame member mounted on frame member 12 which has opposite ends 142 and 144. The numeral 146 refers to a rotatable bag winder tube or bag take-in tube which is mounted on frame member 12 below frame member 140 and which has opposite ends 148 and 150. Support 152 is secured to end 144 of frame member 140 and has a hydraulic motor 154 mounted thereon which has a power or drive shaft 156 extending through plate 152. Sprocket 158 is mounted on shaft 156 for rotation therewith and has a chain 160 extending therearound. A shaft 162 is rotatably mounted on support plate 152 and has sprockets 164 and 166 mounted thereon for rotation therewith. Chain 160 extends around sprocket 164 which drives shaft 162 and sprocket 166. Chain 168 extends around sprocket 166 and sprocket 170 which is mounted on shaft 172 which is rotatably mounted on support plate 152. A smaller sprocket (not shown) is mounted on shaft 172 for rotation therewith between sprocket 170 and support plate 152. Chain 174 extends around the smaller sprocket on shaft 172 and around the outer teeth 175 on sprocket 176 which is mounted on shaft 178 which extends from one end of tube 146. Sprocket 176 is secured to shaft 178 for rotation therewith. Sprocket 176 is provided with a central opening 180 which receives shaft 178. Sprocket 176 also includes an inner hub 182 which has a plurality of alternating recesses 184 and teeth 186 formed therein as seen in FIG. 8.

The numeral 188 refers to a clutch actuator which has an outer set of alternating recesses 190 and teeth 192. The clutch actuator 188 also has an inner set of alternating recesses 194 and teeth 196. As will be explained hereinafter, the recesses 194 and teeth 196 are adapted to mesh with the teeth 186 and recesses 184 when the clutch mechanism is engaged. The clutch actuator 188 has a central opening 198 which rotatably receives the outer end of shaft 178.

Figure 7:
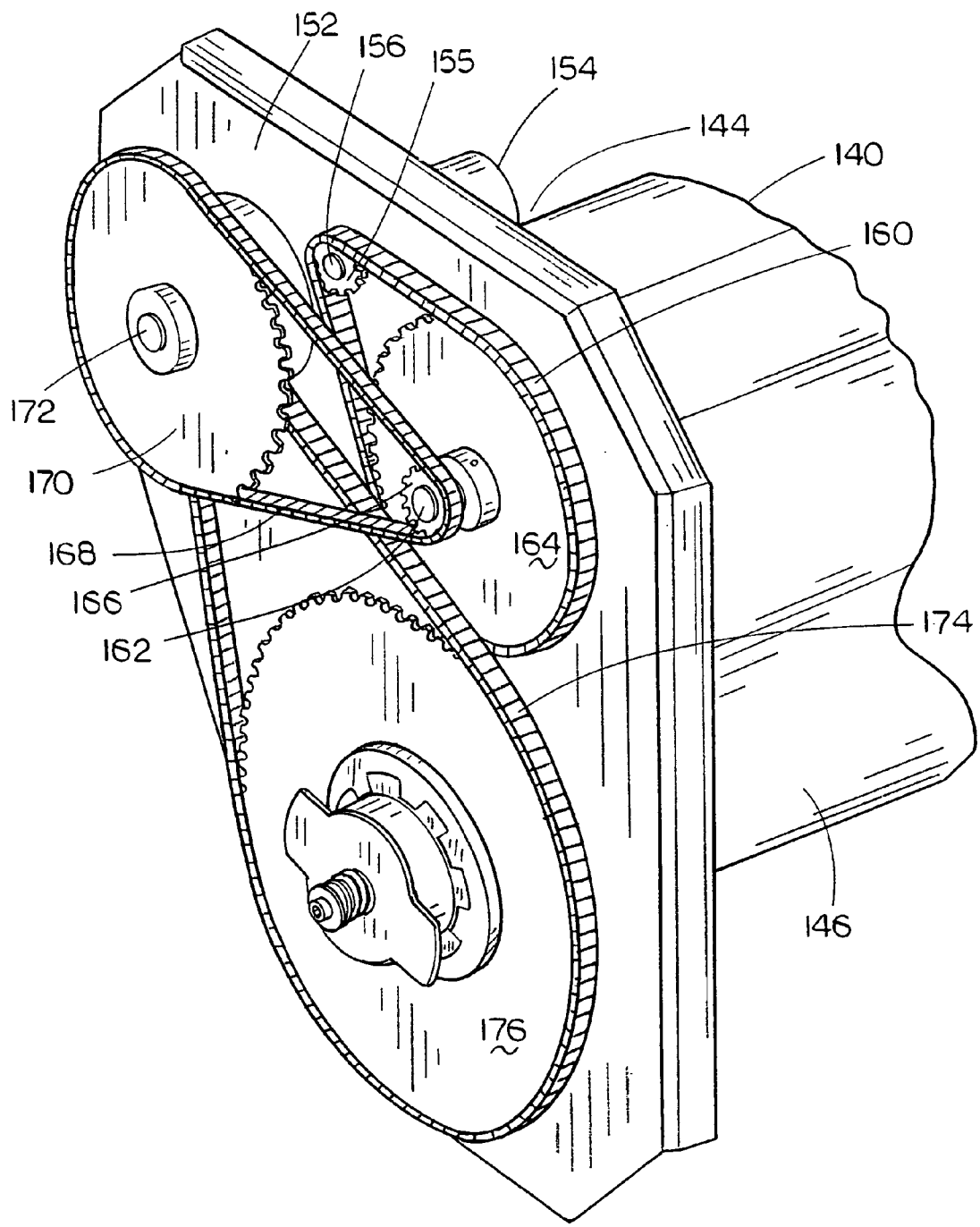
FIG. 7 is a partial perspective view of the drive mechanism for the bag winder tube.

The numeral 200 refers to a sprocket having a central opening 202 which receives shaft 178 therein and which is keyed thereto for rotation therewith. Sprocket 200 has alternating recesses 204 and teeth 206 formed therein which are adapted to mesh with the teeth 196 and recesses 194 of sprocket 188. Clutch actuator 186 has a pair of handles 208 and 210 extending therefrom as seen in FIG. 8. Bolt 212 extends through washer 214, bushing or spacer 216, spring 218, central opening 198 in clutch actuator 188, central opening 202 in sprocket 200, and central opening 180 in sprocket 176 for threadable connection to the internally threaded bore 220 formed in the outer end of shaft 178. The structure just described defines a clutch mechanism 222, which may be used to disengage the tube 146 from the hydraulic motor 154 and the sprocket and gear assembly shown in FIG. 7 when it is desired to remove the empty bag from the tube 146.

Normally, when clutch mechanism 222 is engaged, the teeth 206 and recesses 204 of sprocket 200 will be in mesh with the recesses 194 and teeth 196 of clutch actuator 188 and the recesses 190 and teeth 192 of clutch actuator 188 will be in mesh with the teeth 186 and recesses 184 of sprocket 176 so that actuation of hydraulic motor 154 will cause the tube 146 to be rotated in a bag winding or take-in direction. To disengage the tube 146 from the sprocket and gear assembly and the hydraulic motor 154, the handles 208 and 210 of the clutch actuator are grasped and pulled outwardly to pull clutch actuator 188 outwardly relative to the shaft 178 against the resiliency of spring 218 to disengage the teeth 196 and recesses 194 of clutch actuator 188 from the recesses 204 and teeth 206 and to disengage the teeth 192 and recesses 194 of clutch actuator 188 from the recesses 184 and teeth 186 of sprocket 176. At that time, clutch actuator 188 will be rotated slightly so that the inner faces of the teeth 192 of clutch actuator 188 will be positioned adjacent the outer faces of the teeth 206. The clutch actuator 188 is then moved inwardly with respect to sprocket 200 so that the teeth 192 of clutch actuator are in yieldable engagement with the teeth 206 of sprocket 200 which maintains teeth 192 and recesses 190 of clutch actuator 188 out of engagement with the recesses 184 and teeth 186 of sprocket 176. This means that tube 146 may be freely rotated to unwind the empty bag therefrom since shaft 178 has been disconnected from hydraulic motor 154 and the sprocket and chain arrangement of FIG. 7 since shaft 178 is not connected to sprocket 176.

The invention claimed is:

1. A grain bag unloader for unloading grain from a grain bag wherein the loader is moved rearwardly with respect to the grain bag by a tractor having a hitch, a hydraulic system and a PTO; comprising:
   a wheeled frame having forward and rearward ends and first and second sides;
   a tongue member extending from said forward end of said wheeled frame for connection to the hitch of the tractor;
   an elongated main drive shaft rotatably mounted on said wheeled frame and having forward and rearward ends;
   said forward end of said main drive shaft adapted for coupling to the tractor PTO;
   an elongated, transversely extending first frame member mounted on said wheeled frame and having first and second ends positioned at said first and second sides of said wheeled frame;
   an elongated, horizontally disposed bag winder tube rotatably mounted on said first frame member and having first and second ends;
   a first support at one end of said first frame member;
   a hydraulic motor mounted on said first support;
   said hydraulic motor including a driven shaft;
   a chain and sprocket assembly mounted on said first support which connects said driven shaft of said hydraulic motor to said bag winder tube for rotating said bag winder tube in a bag winding direction;
   said chain and sprocket assembly including a manually movable first clutch assembly which is movable between engaged and disengaged positions;
   said first clutch assembly, when in its said engaged position, enabling said hydraulic motor and said chain and sprocket assembly to rotate said bag winder tube in its said first bag winding direction;
   said first clutch assembly, when in its said disengaged position, causing said bag winder tube to be disconnected from said chain and sprocket assembly so that said bag winder tube may be freely rotated in a bag unwinding direction to enable a bag, which is would upon said bag winder tube, to be pulled therefrom without the resistance of said chain and sprocket assembly and said hydraulic motor;
   a grain hopper at said rearward end of said wheeled frame;
   a transversely extending unloading auger at said rearward end of said wheeled frame adapted to be inserted into the lower end of a filled grain bag;
   said unloading auger being comprised of first and second auger sections which have inner and outer ends;
   said inner ends of said first and second auger sections being in communication with said grain hopper whereby grain in the grain bag will be augered into said grain hopper by said auger sections;
   an inclined discharge auger, having upper and lower ends, mounted on said wheeled frame;
   said lower end of said discharge auger being in communication with said grain hopper;
   said discharge auger extending upwardly and laterally outwardly from its said lower end towards its said upper end;
   a gear box on said wheeled frame having an input shaft and first and second output shafts;
   said input shaft of said gear box being operatively connected to said main drive shaft;
   a first drive train assembly connecting said first output shaft of said gear box to said discharge auger for powering the same;
   a second drive train assembly connecting said second output shaft of said gear box to said unloading auger for powering the same;
   a second clutch assembly imposed in said second drive train which is selectively movable between engaged and disengaged position;
   said second clutch assembly, when in its said engaged position, permitting rotational power to be provided to said unloading auger;
   said second clutch assembly, when in its said disengaged position, preventing rotational power to be provided to said unloading auger thereby deactivating the same;
   said second clutch assembly, by permitting the deactivation of said unloading auger while said discharge auger continues to operate, enabling a person to safely shovel grain into said grain hopper.

2. A grain bag unloader for unloading grain from a grain bag wherein the unloader is moved rearwardly with respect to the grain bag by a tractor having a hitch, a hydraulic system and a PTO; comprising:

a wheeled frame having forward and rearward ends and first and second sides;

a tongue member extending from said forward end of said wheeled frame for connection to the hitch of the tractor;

an elongated main drive shaft rotatably mounted on said wheeled frame and having forward and rearward ends;

said forward end of said main drive shaft adapted for coupling to the tractor PTO;

an elongated, transversely extending first frame member mounted on said wheeled frame and having first and second ends positioned at said first and second sides of said wheeled frame;

an elongated, horizontally disposed bag winder tube rotatably mounted on said first frame member and having first and second ends;

a first support at one end of said first frame member;

a hydraulic motor mounted on said first support;

said hydraulic motor including a driven shaft;

a chain and sprocket assembly mounted on said first support which connects said driven shaft of said hydraulic motor to said bag winder tube for rotating said bag winder tube in a bag winding direction;

said chain and sprocket assembly including a manually movable first clutch assembly which is movable between engaged and disengaged positions;

said first clutch assembly, when in its said engaged position, enabling said hydraulic motor and said chain and sprocket assembly to rotate said bag winder tube in its said first bag winding direction;

said first clutch assembly, when in its said disengaged position, causing said bag winder tube to be disconnected from said chain and sprocket assembly so that said bag winder tube may be freely rotated in a bag unwinding direction to enable a bag, which is would upon said bag winder tube, to be pulled therefrom without the resistance of said chain and sprocket assembly and said hydraulic motor;

a grain hopper at said rearward end of said wheeled frame;

a transversely extending unloading auger at said rearward end of said wheeled frame adapted to be inserted into the lower end of a filled grain bag;

said unloading auger being comprised of first and second auger sections which have inner and outer ends;

said inner ends of said first and second auger sections being in communication with said grain hopper whereby grain in the grain bag will be augered into said grain hopper by said auger sections;

an inclined discharge auger, having upper and lower ends, mounted on said wheeled frame;

said lower end of said discharge auger being in communication with said grain hopper;

said discharge auger extending upwardly and laterally outwardly from its said lower end towards its said upper end;

said main drive shaft being operatively connected so said discharge auger and said unloading auger to provide rotational power thereto.

3. A grain bag unloader for unloading grain from a grain bag wherein the unloader is moved rearwardly with respect to the grain bag by a tractor having a hitch, a hydraulic system and a PTO; comprising:

a wheeled frame having forward and rearward ends and first and second sides;

a tongue member extending from said forward end of said wheeled frame for connection to the hitch of the tractor;

an elongated main drive shaft rotatably mounted on said wheeled frame and having forward and rearward ends;

said forward end of said main drive shaft adapted for coupling to the tractor PTO;

an elongated, transversely extending first frame member mounted on said wheeled frame and having first and second ends positioned at said first and second sides of said wheeled frame;

an elongated, horizontally disposed bag winder tube rotatably mounted on said first frame member and having first and second ends;

a first support at one end of said first frame member;

a hydraulic motor mounted on said first support;

said hydraulic motor including a driven shaft;

a chain and sprocket assembly mounted on said first support which connects said driven shaft of said hydraulic motor to said bag winder tube for rotating said bag winder tube in a bag winding direction;

a grain hopper at said rearward end of said wheeled frame;

a transversely extending unloading auger at said rearward end of said wheeled frame adapted to be inserted into the lower end of a filled grain bag;

said unloading auger being comprised of first and second auger sections which have inner and outer ends;

said inner ends of said first and second auger sections being in communication with said grain hopper whereby grain in the grain bag will be augered into said grain hopper by said auger sections;

an inclined discharge auger, having upper and lower ends, mounted on said wheeled frame;

said lower end of said discharge auger being in communication with said grain hopper;

said discharge auger extending upwardly and laterally outwardly from its said lower end towards its said upper end;

a gear box on said wheeled frame having an input shaft and first and second output shafts;

said input shaft of said gear box being operatively connected to said main drive shaft;

a first drive train assembly connecting said first output shaft of said gear box to said discharge auger for powering the same;

a second drive train assembly connecting said second output shaft of said gear box to said unloading auger for powering the same;

a second clutch assembly imposed in said second drive train which is selectively movable between engaged and disengaged position;

said second clutch assembly, when in its said engaged position, permitting rotational power to be provided to said unloading auger;

said second clutch assembly, when in its said disengaged position, preventing rotational power to be provided to said unloading auger thereby deactivating the same;

said second clutch assembly, by permitting the deactivation of said unloading auger while said discharge auger continues to operate, enabling a person to safely shovel grain into said grain hopper.

\* \* \* \* \*